(12) United States Patent
Stephens

(10) Patent No.: US 7,141,216 B2
(45) Date of Patent: Nov. 28, 2006

(54) SYSTEM FOR SONO-CATALYTIC PRODUCTION OF HYDROGEN

(75) Inventor: Robert D Stephens, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 379 days.

(21) Appl. No.: 10/647,365

(22) Filed: Aug. 25, 2003

(65) Prior Publication Data
US 2005/0048331 A1 Mar. 3, 2005

(51) Int. Cl.
B06B 1/00 (2006.01)
B01J 7/00 (2006.01)
B32B 5/02 (2006.01)

(52) U.S. Cl. ............ 422/128; 48/61; 48/108; 422/127; 422/190; 422/211

(58) Field of Classification Search ............ 48/61, 48/108; 422/127, 128, 190, 211
See application file for complete search history.

(56) References Cited

U.S. PATENT DOCUMENTS 4,588,577 A * 5/1986 Cardinal ............... 423/657
4,702,894 A 10/1987 Cornish

FOREIGN PATENT DOCUMENTS

JP 2002-234702 * 8/2002
JP 2004175583 * 6/2004

* cited by examiner

Primary Examiner—N. Bhat
(74) Attorney, Agent, or Firm—Kathryn A. Marra

(57) ABSTRACT

A device for producing hydrogen includes a container housing a water-based solution and a metal constituent. A generator ultrasonically irradiates the water-based solution in the presence of the metal constituent to produce hydrogen gas.

38 Claims, 2 Drawing Sheets

SYSTEM FOR SONO-CATALYTIC PRODUCTION OF HYDROGEN

FIELD OF THE INVENTION

The present invention relates to hydrogen production, and more particularly to a system for sono-catalytic production of hydrogen.

BACKGROUND OF THE INVENTION

Power supply systems generate electrical or mechanical power to drive machine elements, producing useful work. Fuel cells have been used as a power plant in many power supply systems. For example, fuel cells have been proposed for use in electrical vehicular power plants to replace internal combustion engines (ICE's).

Fuel cells generate electricity that is used to charge batteries and/or to power an electric motor. A solid-polymer-electrolyte fuel cell includes a membrane that is sandwiched between an anode and a cathode. To produce electricity through an electrochemical reaction, hydrogen ($H_2$), is supplied to an anode side of the fuel cell and an oxidant, such as oxygen ($O_2$), is supplied to a cathode side of the fuel cell. The source of the oxygen is commonly air.

Besides fuel cells, other power supply systems have been developed and are currently being developed that process $H_2$. For example, an ICE has been developed that processes $H_2$ to provide drive torque.

Because $H_2$ is required to generate power, on-board $H_2$ storage systems are a focus of research and development. Traditional $H_2$ storage systems include pressurized tanks of gaseous $H_2$ or cryogenic liquid $H_2$ and adsorption/absorption of $H_2$ on or into exotic material. Cryogenic liquid $H_2$ storage includes the potential of $H_2$ loss during extended periods of storage. Both pressurized and cryogenic $H_2$ storage require sophisticated and expensive materials and support systems. Significant energy is associated with depositing and/or extracting $H_2$ in an adsorption/absorption $H_2$ storage system.

SUMMARY OF THE INVENTION

Accordingly, the present invention provides a device for producing hydrogen. The device includes a container housing a water-based solution and a metal constituent. A generator ultrasonically irradiates the water-based solution in the presence of the metal constituent to produce hydrogen gas on demand.

In one feature, the water-based solution is liquid water.

In another feature, the generator ultrasonically irradiates the water-based solution and the metal constituent.

In another feature, the metal constituent comprises a plurality of metal particles. The water-based solution and the metal constituent constitute a heterogeneous mixture.

In another feature, the metal constituent comprises at least one metal plate.

In another feature, the metal constituent coats an interior surface of the container.

In another feature, the generator is housed in the container.

In another feature, the container comprises a head space that retains the hydrogen gas.

In another feature, the device further comprises a compressor that extracts the hydrogen gas from the container.

In still another feature, the metal constituent comprises at least one selected from the group consisting of aluminum (Al), magnesium (Mg), iron (Fe) and Zinc (Zn).

In yet another feature, the metal constituent comprises at least one selected from the group consisting of aluminum (Al), alloys of Al, magnesium (Mg), alloys of Mg, iron (Fe), alloys of Fe, zinc (Zn) and alloys of Zn.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
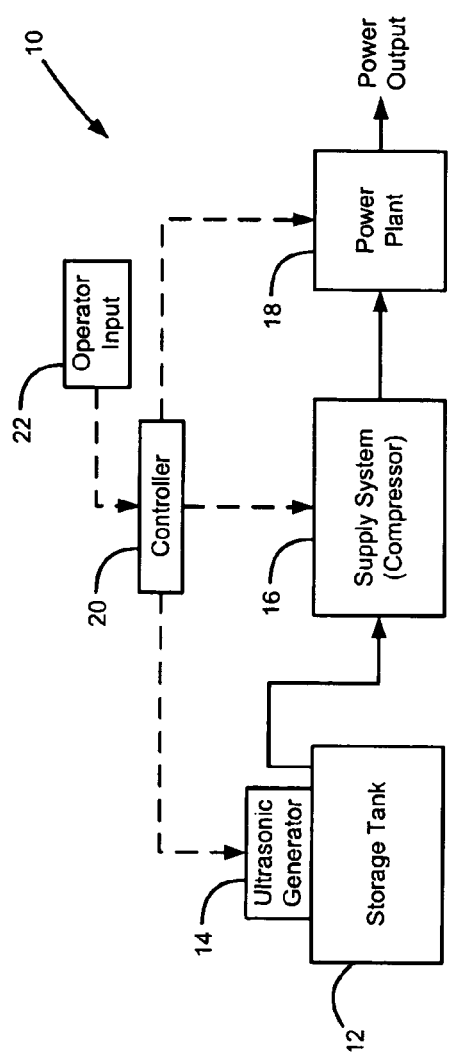
FIG. 1 is a schematic illustration of a power system including a supply system that provides sono-catalytic production of hydrogen.

Referring now to FIG. 1, a power system 10 is schematically illustrated. The power system 10 processes hydrogen ($H_2$) to provide a power output. As used herein, the term power output generically describes electrical and/or mechanical power outputs. Uses of the power system 10 include implementation in a vehicle or as a stand-alone power system. In the case of a vehicle, the power system 10 produces electrical and/or mechanical power to drive the vehicle and associated accessories. In the case of a stand-alone power system, the power system 10 produces electrical and/or mechanical power to power external systems such as, but not limited to residential buildings, commercial buildings, HVAC units and the like.

The power system 10 includes a storage tank 12, an ultrasonic generator 14, a supply system 16 and a power plant 18. A controller 20 controls operation of the individual units and the power system 10 as a whole according to pre-programmed control logic and an operator input 22. The operator input 22 can include a desired power setting or a throttle setting in the case of a vehicle. Alternatively, in the case of a stand-alone power system, the power setting can include a grid demand. The storage tank 12 stores a mixture 24 that produces gaseous $H_2$ when stimulated by the ultrasonic generator. The power plant 18 processes the $H_2$ to produce a power output.

The supply system 16 generally includes a compressor that draws the gaseous $H_2$ from the storage tank 12 and supplies the gaseous $H_2$ to the power plant 18 at a desired pressure. It is anticipated, however, that the gaseous $H_2$ can be produced at the desired pressure and be provided directly to the power plant 18. In such a case, the supply system 16 is not required.

An exemplary power plant 18 includes a fuel cell that dissociates the $H_2$ at its anode to generate hydrogen protons (H⁺) and electrons (e⁻). The fuel cell also includes a polymer electrolyte membrane (PEM) that is proton conductive and dielectric. As a result, the protons are transported through the PEM. The electrons flow through an electrical load (such as the batteries or the electric motor) that is connected across the PEM. Oxygen ($O_2$) at the cathode side of the fuel cell reacts with the protons (H⁺), and electrons (e⁻) are taken up to form water ($H_2O$). Although a fuel cell is described herein as the exemplary power plant 18, it is anticipated that the power plant 18 can include an internal combustion engine (ICE) that processes $H_2$ to provide drive torque.

Figure 2:
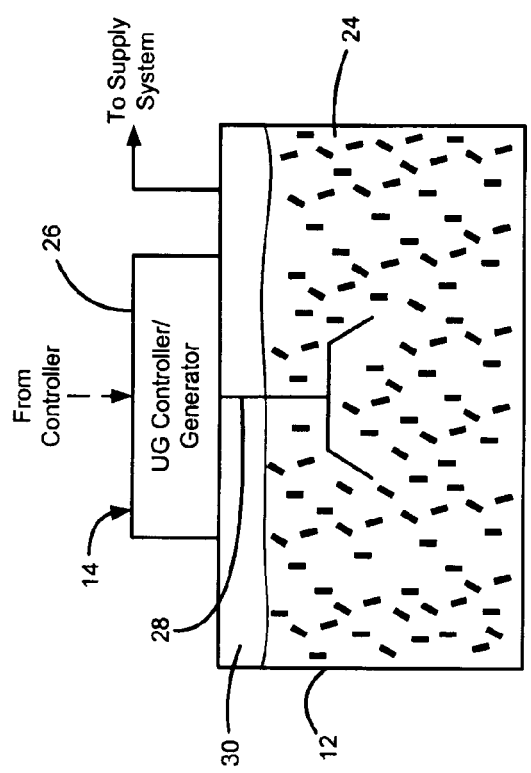
FIG. 2 is a schematic illustration of a supply tank holding a fluid mixture and incorporating an ultrasonic generator.

Referring now to FIG. 2, the storage tank 12 and ultrasonic generator (UG) 14 are schematically shown. The storage tank 12 stores the mixture 24 and the UG 14 is in sonic communication with the mixture 24. That is to say, ultrasonic sound waves generated by the UG 14 travel through the mixture 24 to stimulate the mixture 24. In one embodiment, the UG 14 includes a controller/generator 26 and an ultrasonic horn 28. The horn 28 is immersed in the mixture 24. The controller/generator 26 provides the frequency and power to emit ultrasonic waves from the ultrasonic horn 28. Although the ultrasonic horn 28 is shown immersed in the mixture 24, it is anticipated that the ultrasonic horn 28 need only be in sonic communication with the mixture 24 to transmit the ultrasonic waves through the mixture 24.

The mixture 24 includes a heterogeneous mixture of a water-based solution ($H_2O$) and metal particles. The water-based solution includes liquid water and can include other liquids such as anti-freeze. The inclusion of anti-freeze prevents the water-based solution from freezing at sub-zero temperatures. The metal particles are active metals and include aluminum (Al), magnesium (Mg), iron (Fe) and Zinc (Zn) or any other metal that reacts with $H_2O$ to produce $H_2$. Active metals are metals with low ionization energy and which easily lose electrons to form cations. The most reactive active metals are Group IA (alkali) and Group IIA (alkaline earth) metals. Moderately active metals, including Al, Mg, Zn and Mn are preferred. Less active metals, such as Fe, Sr, Sn, Pb and Cu are useable, with Fe being the most desirable of these. It is also anticipated that Al alloys, Mg alloys, Fe alloys or Zn alloys can be used.

In the case of Al, the reaction is as follows:

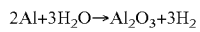

$$2Al + 3H_2O \rightarrow Al_2O_3 + 3H_2$$

When exposed to $H_2O$ the metal particles react and form an oxide coating that covers the metal surface. The coating prevents the bare metal from further reaction with $H_2O$. Therefore, the oxide coating must be removed to enable further $H_2$ production.

When $H_2$ production is required, the controller 20 operates the UG 14 to produce ultrasonic sound waves that are transmitted through the mixture 24. The ultrasonic sound waves are generated at an appropriate frequency and power to create highly energetic bubbles of $H_2O$ vapor within the mixture. The bubbles are at a high temperature (e.g., up to 5000K) and a high pressure (e.g., up to 1000 Atm) and violently collapse against the surfaces of the metal particles. More specifically, the bubbles collapse against the surface of the metal particles producing a shape-charged effect that ablates the metal surface.

Ablation of the surface results in removal of the oxide coating and exposure of the bare metal to the liquid $H_2O$. Additionally, the bare metal surface is exposed to the high temperature $H_2O$ vapor of the collapsing bubble. Thus, the bare metal particle is in direct contact with the $H_2O$ to enable production of gaseous $H_2$. The gaseous $H_2$ escapes from the mixture 24 and collects in a collecting area 30 within the storage tank 12. The supply system 16 draws the gaseous $H_2$ from the storage tank 12 for supply to the power plant 18.

In essence, the ultrasonic sound waves excite the $H_2O$ molecules and metal particles, generating heat. More specifically, the sound waves induce cyclical compression and rarefaction of the $H_2O$. Rarefaction induces vaporization of the $H_2O$ and compression of the vaporized $H_2O$ results in heat generation. Therefore, the rate of $H_2$ production can be controlled by controlling the compression and rarefaction cycles the mixture experiences. The controller 20 provides a signal to the UG controller/generator 26 based on the $H_2$ requirement. The UG controller/generator 26 generates ultrasonic waves at a frequency and power that corresponds to the $H_2$ requirement. That is to say, the UG controller/generator 26 generates ultrasonic waves at a frequency and power that results in a desired interaction of bubbles and metal surfaces to provide the required $H_2$.

Figure 3:
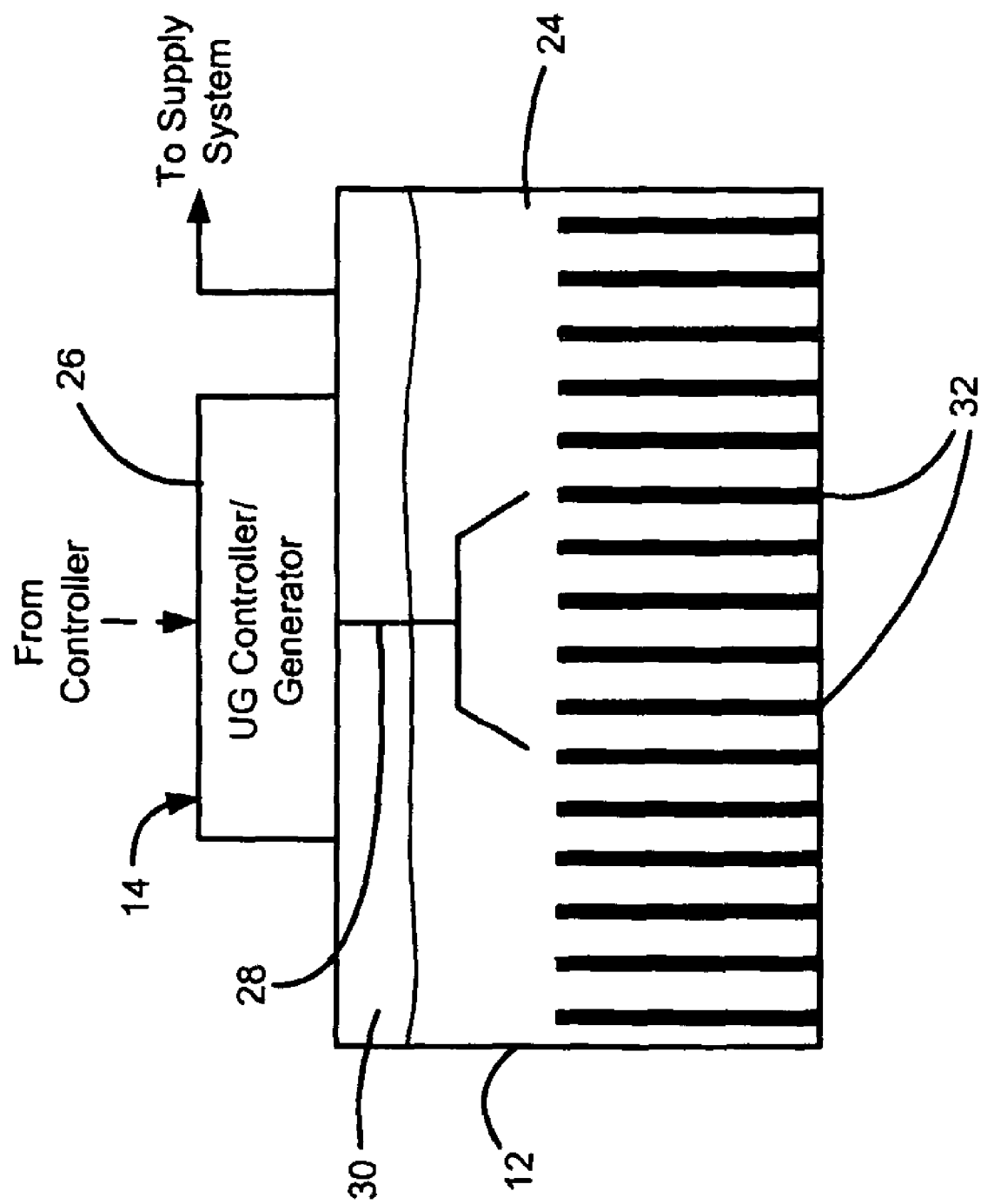
FIG. 3 is a schematic illustration of the supply tank of FIG. 2 holding a fluid having metallic structures immersed therein.

Referring now to FIG. 3, it is anticipated that the metal component of the mixture 24 can take other forms than particles suspended within the liquid water. As schematically shown, a metal plate or multiple metal plates 32 are immersed in the liquid $H_2O$. As similarly described above, the surface of the metal plates 32 form an oxide coating that prevents further reaction between the metal and $H_2O$. The bubbles produced by the ultrasonic stimulation ablate the surface of the plates 32 to enable further reaction between the metal and $H_2O$, as described above.

Although metal particles and plates are described herein, it is anticipated that the metal component of the $H_2O$ and metal mixture can take many forms. These forms include, but are not limited to, bars, particles, plates, spheres and the like or even a metal coating on an interior surface of the storage tank 12. The metal constituent could also be in the form of a wire or multiple wires immersed in the $H_2O$. It is desired that the surface area of the metal be maximized to enable increased exposure of bare metal surface to $H_2O$ after ablation by the bubbles. Particularly for vehicle applications, another consideration is that the ratio of metal to $H_2O$ be optimized such that an excess of either is prevented or minimized. In other words, the material usage should be minimized so that the mass of $H_2$ produced represents the highest possible ratio to overall system mass. This ratio does not need to be restricted for other, non-vehicle applications where weight is not a factor.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A device for producing hydrogen, comprising:
   a container housing a solution consisting essentially of water and a metal catalyst; and
   a generator that ultrasonically irradiates said solution operably ablating a surface of said metal catalyst, removing oxide from said surface and providing hydrogen gas.

2. The device of claim 1 wherein said solution is free of at least one of a chelating agent and a metal hydride.

3. The device of claim 2 wherein said solution further comprises an antifreeze agent.

4. The device of claim 1 wherein said metal catalyst comprises a plurality of metal particles.

5. The device of claim 4 wherein said water-based solution is a heterogeneous mixture.

6. The device of claim 1 wherein said metal catalyst comprises at least one metal plate.

7. The device of claim 1 wherein said metal catalyst coats an interior surface of said container.

8. The device of claim 1 wherein said generator is housed in said container.

9. The device of claim 1 wherein said container comprises a head space that retains said hydrogen gas.

10. The device of claim 1 further comprising a compressor that extracts said hydrogen gas from said container.

11. The device of claim 1 wherein said metal catalyst is aluminum (Al).

12. The device of claim 1 wherein said metal catalyst comprises at least one selected from the group consisting of aluminum (Al), alloys of Al, magnesium (Mg), alloys of Mg, iron (Fe), alloys of Fe, zinc (Zn) and alloys of Zn.

13. A device of claim 1 wherein said device is part of a vehicle.

14. A power supply system that processes hydrogen to produce power, comprising:
  a container housing a water-based solution and a metal catalyst;
  a generator that ultrasonically irradiates said water-based solution in the presence of said metal catalyst thereby ablating said catalyst to produce hydrogen gas;
  a fuel cell that consumes said hydrogen gas to produce a power output; and
  a supply unit with an inlet in fluid communication with said container, an outlet in fluid communication with said fuel cell, and a compressor that extracts said hydrogen gas from said container.

15. The power supply system of claim 14 wherein said water-based solution is essentially free of at least one of a chelating agent and a metal hydride.

16. The power supply system of claim 14 wherein said metal catalyst comprises a plurality of metal particles.

17. The power supply system of claim 16 wherein said water-based solution and said metal catalyst constitute a heterogeneous mixture.

18. The power supply system of claim 14 wherein said metal catalyst comprises at least one metal plate.

19. The power supply system of claim 14 wherein said fuel cell is an engine that produces drive torque.

20. The power supply system of claim 14 wherein said fuel cell produces electrical power.

21. The power supply system of claim 14 wherein said hydrogen gas is produced at a pressure directly consumable by the fuel cell.

22. The power supply system of claim 14 wherein said generator is housed in said container.

23. The power supply system of claim 14 wherein said container comprises a head space that retains said hydrogen gas.

24. The power supply system of claim 14 wherein said metal catalyst is aluminum (Al).

25. The power supply system of claim 14 wherein said metal catalyst comprises at least one selected from the group consisting of aluminum (Al), alloys of Al, magnesium (Mg), alloys of Mg, iron (Fe), alloys of Fe, zinc (Zn) and alloys of Zn.

26. The power supply system of claim 14 wherein said power output moves a vehicle.

27. A power system comprising:
  a hydrogen gas producing device comprising an ultrasonic generator operable to ablate a catalyst and a container filled with at least one metal catalyst and water that is free is of at least one of a chelating agent and a metal hydride;
  a power plant operable to convert hydrogen gas into an output of power;
  a supply system operably feeding hydrogen gas produced by said device to said power plant;
  a controller operably controlling operation of said power system; and
  an operator input.

28. The power system of claim 27 wherein said at least one metal catalyst is aluminum (Al).

29. The power system of claim 27 wherein said at least one metal catalyst comprises at least one selected from the group consisting of aluminum (Al), alloys of Al, magnesium (Mg), alloys of Mg, iron (Fe), alloys of Fe, zinc (Zn) and alloys of Zn.

30. The power system of claim 27 wherein said controller operably controls at least one of the group consisting of said ultrasonic generator, said container, said supply system, and said power plant.

31. The power system of claim 27 further wherein said operator input is at least one of a power setting, a grid demand, or a throttle setting.

32. The power system of claim 27 wherein said water further comprises an antifreeze agent.

33. The power system of claim 27 wherein said ultrasonic generator is housed in said container.

34. The power system of claim 27 wherein said supply unit comprises an inlet in fluid communication with said container and an outlet in fluid communication with said power plant.

35. The power system of claim 27 wherein said supply unit comprises a compressor that extracts said hydrogen gas from said container.

36. The power system of claim 27 wherein said hydrogen gas is produced at a pressure directly consumable by the power plant.

37. The power system of claim 27 wherein said power plant is a fuel cell operable to produce electricity.

38. The power system of claim 27 wherein said power plant is part of an automotive vehicle.

* * * * *